United States Patent [19]

Griffin

[11] Patent Number: 4,991,956

[45] Date of Patent: Feb. 12, 1991

[54] APPARATUS FOR FACILITATING CORRELATION WITH A TRANSPARENCY IMAGE

[76] Inventor: Stephen L. Griffin, 3043 Nantucket, San Antonio, Tex. 78230

[21] Appl. No.: 317,852

[22] Filed: Mar. 2, 1989

[51] Int. Cl.$^5$ .............................................. G03B 21/00
[52] U.S. Cl. ..................................... 353/30; 353/122; 353/37; 353/94
[58] Field of Search .................. 353/122, 121, 28, 30, 353/34, 37, 74-79, 20, 94

[56] References Cited

U.S. PATENT DOCUMENTS

| | | | |
|---|---|---|---|
| 3,381,574 | 5/1968 | Wells | 353/78 X |
| 3,506,351 | 4/1970 | Geitz | 353/37 X |
| 3,895,866 | 7/1975 | Quervain | 353/30 |
| 4,564,276 | 1/1986 | Hofmann et al. | 353/55 |
| 4,722,593 | 2/1988 | Shimazaki | 353/122 X |
| 4,770,525 | 9/1988 | Umeda et al. | 353/102 X |

FOREIGN PATENT DOCUMENTS

| | | | |
|---|---|---|---|
| 33358 | 3/1973 | Australia | 353/78 |
| 990557 | 6/1976 | Canada | 353/94 |
| 2559923 | 8/1985 | France | 353/122 |

OTHER PUBLICATIONS

Brochure: "Now there's a better way for the new construction industry to make take-offs"; McGraw-Hill, Inc.

Brochure: "How to Make More and Better Contacts in New Construction Without Leaving Your Office"; McGraw-Hill, Inc. (1988).

Photocopy of brochure: "Computer Systems for Contractors"; Estimation, Inc.

Photocopy of magazine advertisement: "Introducing Sharp's Newest Computer Projection Panel"; Sharp Electronics Corporation (1988).

*Primary Examiner*—Harry N. Haroian
*Attorney, Agent, or Firm*—Cox & Smith Incorporated

[57] ABSTRACT

This invention provides a computerized apparatus and method which involves light projection to enable take-offs and estimations from job plans which can be represented either in paper form or as light projections themselves. The apparatus has a light projector which is capable of projecting a cursor image coincidentally with a microfilm projection of the plans in one mode, and can be easily switched to project the cursor image onto paper plans in a second mode. A computer is connected with that light projector to control the movement of the cursor on the plans in such a manner that a user of the system can make takeoffs and estimations with the computer.

4 Claims, 4 Drawing Sheets

APPARATUS FOR FACILITATING CORRELATION WITH A TRANSPARENCY IMAGE

BACKGROUND OF THE INVENTION

The present invention relates to methods and apparatus for enabling an individual to estimate, or make "takeoffs" of, quantities and dimensions from job plans. More particularly, the present invention relates to light projectors and computerized systems for enabling takeoffs from job plans.

The working drawings (i.e., the floor plan, the site plan, the electrical plan, etc.) produced for constructing a building or other project are referred to generally as the "job plans", or just "the plans", of the project. Once such plans are produced, much of the remaining engineering, bidding and construction processes revolve about them. Electrical contractors, mechanical contractors and various others must use those plans to generate estimations of the amount of supplies and the cost of the equipment and services needed to complete the respective portions of the project.

In order to produce such estimations, an individual must view the plans (or a facsimile thereof) and translate them into representative numbers or figures. Such numbers and figures and any other representations taken from the plans are referred to as "takeoffs", and the process by which they are produced is commonly referred to as "making takeoffs" from the plans. The traditional method for making takeoffs involves using a scale, a pen and paper to tediously count and measure the number and dimensions of the components needed and then record the same on paper. From these records, the price per quantity or size of each type of component can be used to generate an estimation or a bid on the job.

This manner of making takeoffs can entail many hours of measuring, calculating, and checking for errors. For instance, a prospective electrical contractor would, as he viewed the electrical plans, individually count the number and note the specifications of each and every outlet or other electrical fixture shown on the plans. Then he would use a linear scale to estimate the length of and figure the gauge of all the wiring needed to connect the fixtures, making records along the way. Many other types of contractors also commonly make takeoffs from plans for bidding, including electrical, mechanical, HVAC, landscape, interiors and other subcontractors.

Accordingly, numerous parties are in need of access to the job plans throughout the planning, bidding and construction processes. Unfortunately, if a prospective contractor cannot obtain a copy of the plans themselves, access to the plans typically requires making frequent trips either to the general contractor or to local administrative agencies which keep the plans on record for public access. Such constraints are time consuming, wasteful and therefore costly.

Furthermore, when several parties are desirous of using the same plans, the plans often become worn, torn, marked on by others, or otherwise become illegible in the process of their use, especially since the engineering, bidding and construction processes may take several years to complete. Due to the necessary size of a sheet of plans, they must also be rolled or folded and can be difficult to store.

To circumvent such problems, other more advantageous forms of representing and using the plans of a project have been sought. Along this line, it is an object of the present invention to enable quicker and easier takeoffs from the project plans. It is also an object of the present invention to preserve the life of the plans or plan facsimiles from which takeoffs are taken. Another object is to enable making of takeoffs without the traditional tedious process of measuring, counting and recording by hand.

With the advent of microfilm, it was found that copying the paper versions of the plans onto microfilm enabled convenient and wide distribution of the plans to all parties who might desire them. In this manner, many of the difficulties with transporting, storing, and maintaining paper plans were alleviated. In fact, the F.W. Dodge Division ("Dodge") of McGraw-Hill Information Systems Company currently provides the service of providing microfilm copies of job plans to subscribers who are manufacturers or distributors of the types of products needed in those job plans. That greatly opens the market for such manufacturers and distributors by giving them quick access to a large number of plans where they may find business opportunities. Dodge has been in this business for several years and has advertised that more than 6,000 firms currently subscribe to those services. In conjunction with the provision of such microfilm, the Dodge Division provides viewers called "Dodge/SCAN" viewers, for projecting an image from the microfilms onto a screen from which takeoffs may be taken.

Other systems are also known for enabling the making of takeoffs, including computerized estimating systems having length and count probes for takeoff measurements directly from a job plan. Such length and count probes are employed in direct contact with job plans to count and trace out the scaled length of component dimensions. The measurements and counts from such probes are entered directly into a computer system in which they are factored for material and labor prices in order to generate an estimate for the job.

However, the process of making takeoffs and secondary estimations, even with the known improvements as mentioned above, still remains as a tedious and time-consuming process subject to error, and it is an object of the present invention to further enable quicker, easier and more accurate takeoffs from project plans.

Another object of the present invention is to provide a means for adapting to presently known apparatus which project the image of a job plan in a manner which enables quick and accurate counting and measuring of features on the projected job plan and which further factors such measurements into advantageous forms. Other objects of the present inventor include overcoming the problems and difficulties encountered and presented by the prior art, and still others will be obvious to one of ordinary skill in the art from a reading of this specification.

SUMMARY OF THE INVENTION

The present invention provides a novel apparatus and method for enabling estimates, primarily takeoffs, relative to a representation of a job plan (the "first representation"). The apparatus of the present invention may interface with a microfilm viewing table having a viewing screen in a manner such that the first representation can be in forms such as a paper or microfilm copy of the plans placed or projected onto the viewing screen. A first image (also referred to as the "controlled image") is superimposed onto the first representation on the viewing screen so that the two can be correlated and to produce second, third and fourth representations that correlate with the plans. Those representations are produced in a computer's memory, on the viewing screen, and on a paper printout. Alternatively, rather than interfacing with a microfilm viewing table, an embodiment of the invention may, itself, include essential features of such a table.

The apparatus of the present invention may comprise a computer for facilitating projecting the first image in a light beam onto a surface on which the first image can be visually correlated with the first representation. The computer may be linked with a controlling means (also referred to as the "altering means") to enable a user to control the altering means. Many other advantages are provided by embodying the altering means as a high-resolution liquid crystal display positioned in the path of said beam.

The computer may also comprise means which enables production of a second representation in response to the signals received by means of a signal receiving means which may be reduced by the computer into a usable form referred to as a "third representation" which may be computer printouts and displays on a viewing screen or a CRT.

The computer may also be adapted to produce a fourth representation when operating in an appropriate mode, which fourth representation represents the alteration of said first image by the altering means as it is controlled by the user to move a cursor image from one end to the other of a linear dimension on the viewing screen. The value of the total length of the particular feature may then be produced from the fourth representation.

The apparatus of the present invention may include a second projecting means which produces the first representation in the form of a second image projected onto the viewing screen. A first projecting means may further comprise means for superimposing the first image over the second image on the viewing screen.

A light source of the apparatus may comprise a bulb and a means for projecting light from the bulb in a beam. A heat shield may be positioned between the bulb and certain heat-sensitive components for shielding those components. A dichroic mirror may also be employed to reflect the light in a beam without reflecting heat associated therewith. The apparatus may also comprise a fan means for causing circulation of fluids, such as air, to cool components.

Means for directing the light beam onto the viewing screen may comprise a first surface mirror, a Fresnel condensing lens, a projection lens, and a second mirror including a first part which is a transparent mirror positionable in the path of said beam for superimposing the first image over the second image on the viewing screen. The second mirror may further comprise a second part for completely reflecting said beam toward the viewing screen and may be adjustable for alternating between two modes—a first mode in which the controlled image is superimposed on a projected image of the plans, and a second mode in which the controlled image can be viewed through paper plans placed on the viewing screen.

The method of the present invention basically comprises the step of projecting a first image onto a surface on which said first image can be correlated with a first representation, which represents the job plan. The method may further include the steps of initializing a second representation which is useful for making estimations relative to said first representation; identifying a portion of said first representation by causing alteration of said first image in a manner which correlates with the identified portion of said first representation; and modifying said second representation in a manner which accounts for features represented in the identified portion of said first representation, thereby enabling estimation relative to the identified portion of said first representation. Further, the identifying step and the modifying step can be repeated as necessary until said second representation has been modified in correlation with every desired portion of said first representation. The method may also include producing said first representation by projecting a second image onto said surface and/or using a liquid crystal display to alter said first image in correlation with said first representation.

The apparatus and method as described in the preceding paragraphs and as further described in the following, more detailed description of preferred embodiments enable takeoffs and other estimates relative to the job plans which may be either projected, placed or otherwise represented on the viewing screen by causing alteration of the controlled image in a manner which correlates with the job plans and, then, producing other representations which represent takeoffs from the plans by means such as a computer's controls which monitor or determine the alterations of the controlled image. Thus, through various controls, features and other details of the apparatus, the controlled image can be correlated with the plans placed, projected or otherwise represented on the viewing screen in a manner which produces useful representations of that correlation. Those representations may represent not only count and/or length takeoffs but may also represent further estimations relative to the plans, including cost estimations and area and volume takeoffs. The apparatus may even conclude a run of its operation by producing a representative printout of those representations.

Many other objects, features, and advantages of the present invention will become evident to those skilled in the art in light of the foregoing and following descriptions of the present invention taken in conjunction with the attached drawings and the appended claims, which descriptions particularly emphasize a detailed description of a first and a second embodiment. However, the true spirit and scope of the invention is defined by those appended claims.

DETAILED DESCRIPTION OF THE PREFERRED EMBODIMENTS

Figure 1:
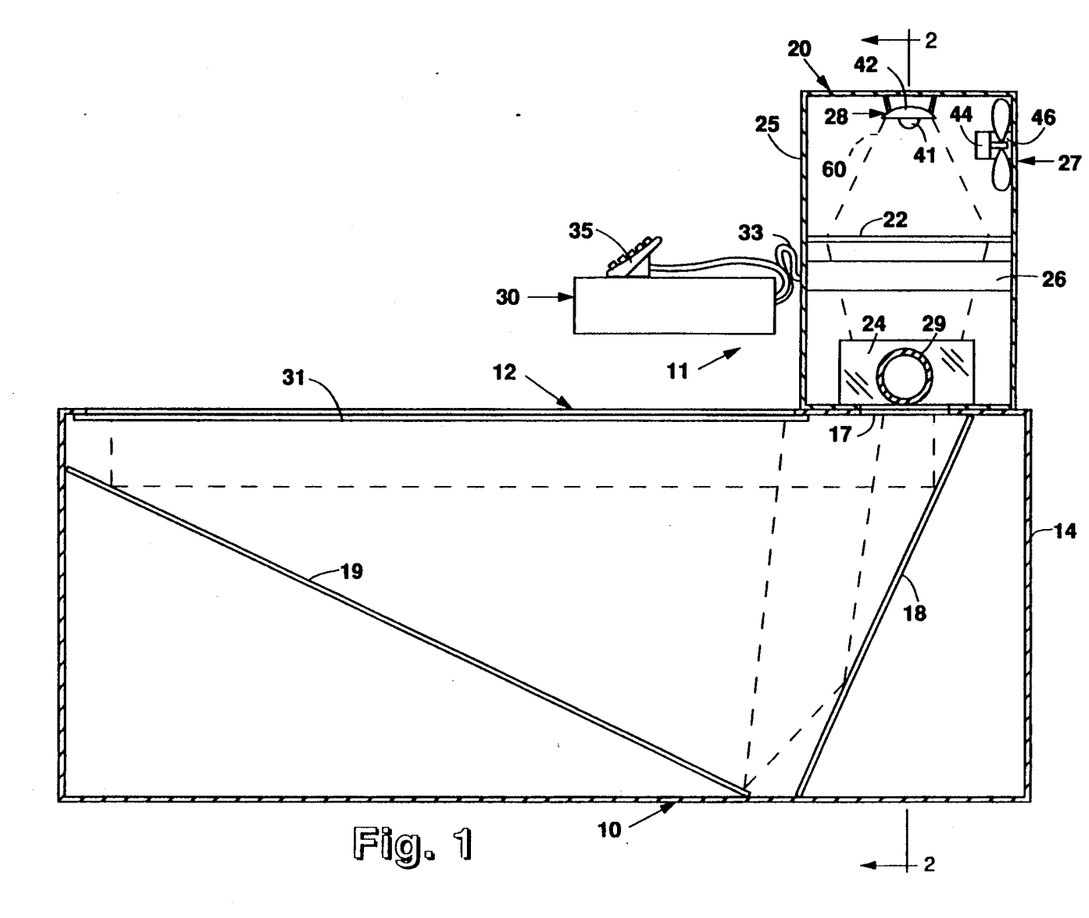
FIG. 1 shows a cross-sectional view of a first embodiment of the light projection estimating system 10 of the present invention, as operatively employed to enable estimations of plans projected or otherwise located on viewing screen 31. The cross section of FIG. 1 is shown in FIG. 2 as section line 1-1.
Figure 2:
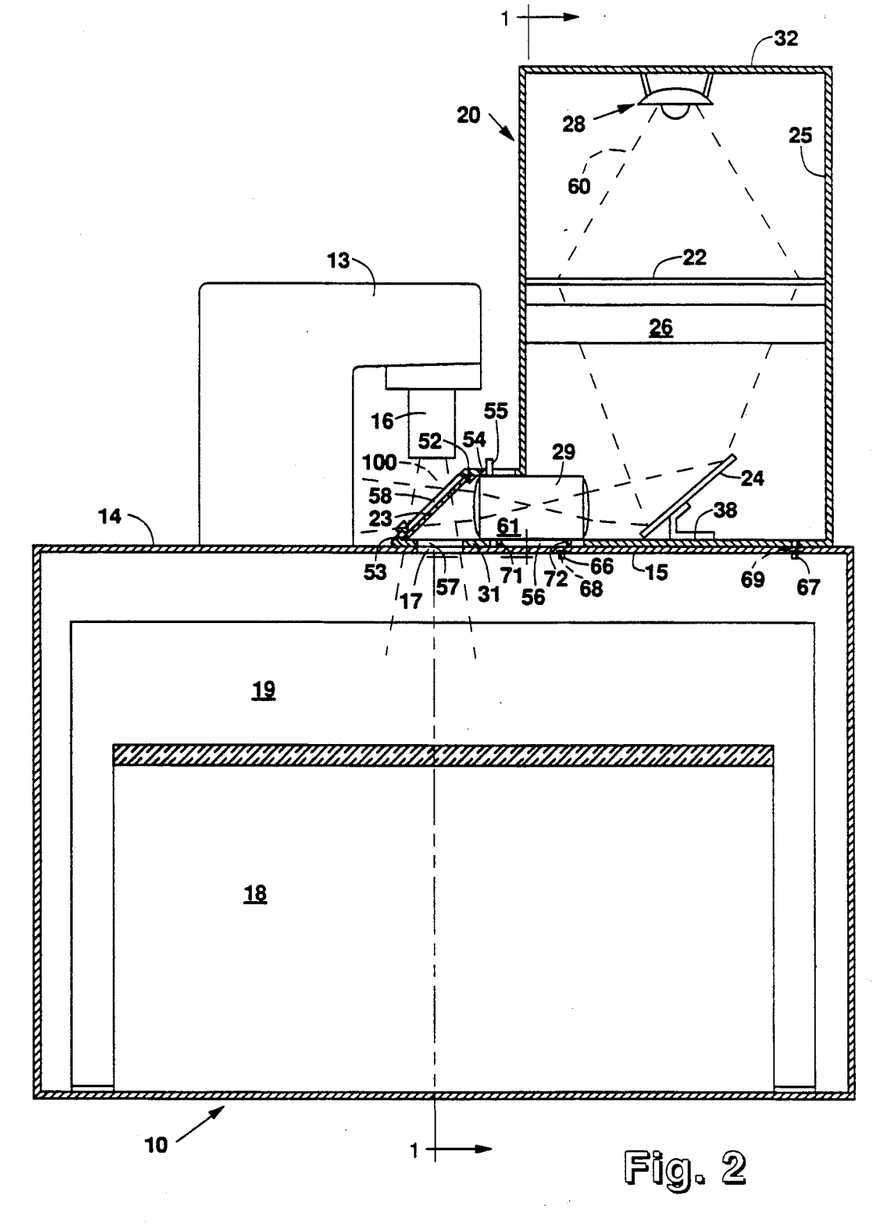
FIG. 2 shows a cross-sectional view of the light projection estimating system 10 of FIG. 1 as viewed on section line 2-2 of FIG. 1 with certain components shown full round.

FIGS. 1 and 2 are cross-sectional views of a light projection estimating system 10 according to the present invention in which the projected light beams are represented by dashed lines. Light projection estimating system 10 comprises a general purpose computer 30, a microfilm viewing table 12 (referred to herein as "table" 12), a microfilm projector 13 (shown in FIG. 2) and an interfacing projector 20 for interfacing between computer 30 and table 12. The microfilm projector 13 is mounted to table 12 and projects a light beam through microfilmed plans in a manner which projects a representative image of those plans onto viewing screen 31 of table 12. Takeoffs can be made directly from said representative image. Although computer 30 is represented schematically in FIG. 1, in actuality computer 30 may rest in an ordinary fashion on a surface such as the surface of viewing screen 31 or the surface of a table (not shown) adjacent light projection estimating system 10.

Table 12 can also be used to support paper copies of plans on the upper surface of viewing screen 31. The representation of the plans on viewing screen 31, either projected thereon by microfilm projector 13 or placed thereon in the form of paper copies, is also referred to as the first representation. Table 12 and microfilm projector 13 comprise a "Dodge/SCAN" viewer, available from the F.W. Dodge Division ("Dodge") of McGraw-Hill Information Systems Company, or a similar device.

Computer 30 and interfacing projector 20 are collectively referred to as "estimator" 11 and enable takeoffs and other estimations from plans projected or placed onto viewing screen 31 in accordance with this invention. Computer 30 selectively energizes pixels (or "dots") of a liquid crystal display 26 which is located in the light path from a light source 28 to viewing screen 31. As a result, light beam 60 passes through liquid crystal display 26 ("LCD 26") and the image projected in light beam 60 is therefore altered to conform with the image defined by the pixels of LCD 26, which in turn are controlled by computer 30. The image projected in light beam 60 is then projected onto viewing screen 31. More specifically, the computer 30 of the first embodiment controls LCD 26 to alter the image projected in light beam 60 in a manner which projects a cursor image and other images onto viewing screen 31, as will be discussed further herein.

Interfacing projector 20 also includes a Fresnel condensing lens 22, a projection lens 29, a first mirror 24, and a second mirror 23. Those features and others are provided in interfacing projector 20 for directing and focusing light beam 60 and the desired image onto viewing screen 31.

Interfacing projector 20 projects beam 60 onto viewing screen 31 in one of two alternative modes, Mode I and Mode II. In Mode I, second mirror 23 causes light beam 60 to be directed coincidently with beam 100 projected from microfilm projector 13. Such coincident direction causes the image projected in light beam 60 to be superimposed on viewing screen 31 over the image projected by microfilm projector 13. Then, a user of system 10 can visually correlate the image (referred to as the "first image" or the "controlled image") projected by interfacing projector 20 with the image (referred to as the "second image" or the "representative image") projected by microfilm projector 13. By entering commands into computer 30, the user of system 10 can then cause alteration of the controlled image such that a cursor image moves relative to the representative image. The user of system 10 can also enter commands into computer 30 to cause collection and storage of data representing takeoffs, such as the number of and/or the length of features, of the plans. The control of computer 30 is discussed in more detail further herein with reference to FIG. 4

In Mode II operation, the light projection estimating system 10 is adjusted to function as in Mode I except that a paper copy of the plans, rather than a projected image of the plans, is placed on viewing screen 31. To accomplish Mode II operation, interfacing projector 20 is adjusted (as will be discussed further herein) in a manner which intensifies the controlled image projected on viewing screen 31 while simultaneously blocking beam 100 so that the controlled image is viewable through the paper plans. Thus, light projection estimating system 10 is capable of use when microfilm copies of plans are not available, and the controlled image can be viewed in correlation with the first representation either projected or placed on viewing screen 31. Change of the mode of operation from Mode I to Mode II is controlled by adjustment (described further herein) of second mirror 23.

As indicated above, when interfacing projector 20 is operated in Mode I, interfacing projector 20 functions as a means for enabling viewing of the controlled image from interfacing projector 20 in correlation with a second image projected by microfilm projector 13. Table 12 basically compromises reflecting chamber 14 and viewing screen 31. Reflecting chamber 14 has reflecting surfaces 18 and 19 mounted therein. Microfilm projector 13 is mounted atop table 12. To project the representative image of the plans onto viewing screen 31, microfilm copies (not shown) of the plans are received within microfilm projector 13 in a position such that light from a light source therein can be projected through a desired portion of the microfilm copies (i.e. the portion representing the plans).

The light source within microfilm projector 13 projects a light beam through the desired portion of the microfilm copies when microfilm projector 13 is turned on by a user of table 12. That light beam, projected beam 100, is directed vertically downward toward an aperture 17 in the upper surface of reflecting chamber 14. During Mode I operation, passage of projected beam 100 through aperture 17 is enabled; whereas, during Mode II operation, such passage is precluded by second mirror 23. Of course, projection of projected beam 100 through aperture 17 is also precluded when the light source of microfilm projector 13 is turned off.

Referring to Mode I operation, projected beam 100 is directed to and reflected by reflecting surfaces 18 and 19 to project the representative image onto viewing screen 31. The representative image of beam 100 is focused on viewing screen 31 by manually adjusting projection lens 16. The representative image therefore represents the desired portion of the microfilm copy, as is standard in the field of microfilm projectors. Perpendicular cross sections of projected beam 100 are roughly quadrilateral and correspond with the shape of viewing screen 31.

Reflecting chamber 14 of table 12 is a box-like enclosure containing reflecting surfaces 18 and 19 therein. Reflecting surfaces 18 and 19 are mounted to the interior of reflecting chamber 14 at a right angle relative to one another in an orientation which enables reflection of projected beam 100 onto viewing screen 31. Viewing screen 31 is a semi-transparent screen for enabling viewing of light images by an individual having a vantage point above viewing screen 31. The representative image and the controlled image can therefore be viewed and visually correlated on screen 31 from above. Viewing screen 31 is rigid and has strengths sufficient to support downward forces thereon such as are needed for using screen 31 as a writing surface. The ratio of the length dimension to the width dimension of viewing screen 31 is 4:3. Alternatively, viewing screen 31 could be embodied as electrical or other means such as a bank of photo-electric transducers for enabling correlation of the controlled image with the first representation in a manner equivalent to visual correlation. Microfilm projector 13 is permanently mounted atop the upper surface 15 of reflecting chamber 14 in an orientation which enables projection of projected beam 100 vertically downward from lens 16 through aperture 17. Aperture 17 is an opening in upper surface 15 which is slightly larger than the bounds of projected beam 100 and light beam 60 passing therethrough for allowing complete passage of those beams into reflecting chamber 14.

Computerized estimator 11 includes interfacing projector 20 and computer 30 with standard connections therebetween. Interfacing projector 20 comprises a housing 25, fan 27, a light source 28, a Fresnel condensing lens 22, LCD 26, first mirror 24, projection lens 29, and second mirror 23. Computer 30 is linked directly with LCD 26 by standard connections therebetween. Second mirror 23 is positioned to intercept projected beam 100. Housing 25 is a rigid enclosure having the shape of a rectangular prism with leg 31 extending therefrom. Leg 31 is a partial enclosure which protrudes from the prismatic shape of housing 25 for operatively supporting second mirror 23.

Light source 28 is a 900 watt halogen light bulb 41 mounted in a reflector 42' mounted to the upper wall 32 of housing 25. The light source 28 is positioned in a manner which directs light in a beam 60 (the boundaries of which are represented by dashed lines) toward Fresnel condensing lens 22.

Figure 1A:
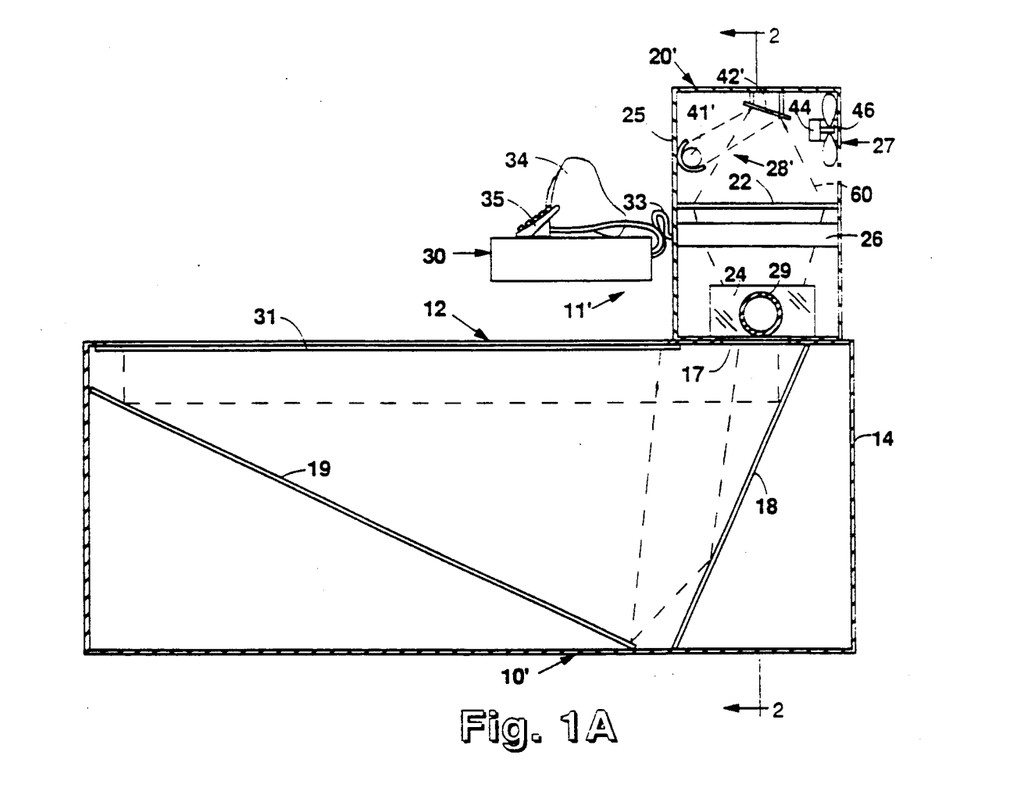
FIG. 1A shows a cross-sectional view of a second embodiment of the light projection estimating system 10 of the present invention, having light source 28' substituted for the light source 28 of FIG. 1.

In a second embodiment of the present invention, as shown in FIG. 1A, a more complicated light source, light source 28', is substituted for the light source 28 of FIG. 1. Referring to FIG. 1A, light source 28' is a 900 watt halogen light bulb 41' mounted in a reflector 43 and combined with a dichroic reflector 42'. The light source 28' is mounted to the upper wall 32 and the side wall 33 of housing 25. Light source 28' includes a 900 watt halogen light bulb 41' in combination with a heat shield 43 and a dichroic reflector 42'. Heat shield 43 and dichroic reflector 42' are employed for minimizing heat transfer from the bulb 41 to Fresnel condensing lens 22 and LCD 26 below. Heat shield 43, more specifically, is a paraboloidically-shaped heat shield which is composed substantially of styrofoam. The concave surface of heat shield 43, however, is covered with aluminum which is finished to reflect light from bulb 41' toward dichroic reflector 42'. To protect LCD 26 from damage and malfunction due to the degree of heat radiating from bulb 41', heat shield 43 is included in light source 28' in a position directly between bulb 41' and LCD 26 to minimize heat radiation therebetween. Dichroic reflector 42' is a standard dichroic reflector which reflects visible light but allows transmission of heat and infrared radiation therethrough. Thus, high intensity visible light is directed from the halogen bulb 41' through LCD 26 without much of the associated heat. The light source 28' is positioned in a manner which directs light in a beam 60' (the boundaries of which are represented by dashed lines) toward Fresnel condensing lens 22 while maximizing the intensity of visible light of light beam 60' but minimizing heat transfer from bulb 41' to Fresnel condensing lens 22 and LCD 26. Otherwise, the second embodiment of FIG. 1A is identical to and functions the same as the embodiment of FIG. 1. Most of the features of FIG. 1A other than light source 28 are, therefore, numbered the same as the corresponding identical features in FIG. 1.

Referring again to the embodiment of FIG. 1, fan 27 is a means for cooling the interfacing projector 20, especially for preventing heat from light source 28 from overheating Fresnel condensing lens 22 and LCD 26. The motor 44 of fan 27 is securely mounted to support 46, which support is integrally connected with housing 25. Vents (not shown) are provided in housing 25 for enabling provision of fresh air from the atmosphere to within housing 25. Light source 28 and fan 27 are empowered by and operatively connected to a common power source (not shown).

Fresnel condensing lens 22 is a thin lens of a type standardly available having stepped setbacks for enhancing its focal characteristics to approximate a much thicker lens. Fresnel condensing lens 22 is mounted horizontally within housing 25 and is for condensing, diffusing and focusing light beam 60. In both Mode I and Mode II operation, beam 60 is directed, in linear succession, from light source 28, through Fresnel condensing lens 22, through LCD 26, to first mirror 24 through projection lens 29 and to second mirror 23.

Liquid crystal display 26 ("LCD 26") is a means for altering the image projected by beam 60 in a manner controlled by computer 30, as will be discussed further herein. LCD 26 of the first embodiment comprises a high-resolution LCD standard in the art of liquid crystal displays, specifically a liquid crystal display produced by Sharp Electronics Corporation, model no. QA-50 having a resolution of 640×480 pixels (i.e. a total of 307,200 pixels). An individual pixel of LCD 26 is either opaque or clear, depending on whether the individual pixel is energized (or "polarized"). When a pixel is opaque it precludes passage of beam 60 therethrough, but when such a pixel is clear it does not affect beam 60. The dimensions of the screen of LCD 26 have a 4:3 ratio (640:480=4:3) and thus correspond with the size dimensions of viewing screen 31. The image projected through LCD 26 is enlarged with its shape oriented to match with the full dimensions of viewing screen 31. Each pixel of LCD 26 controls an elemental portion of the image projected in light beam 60 onto viewing screen 31, controlling that elemental portion to either be light or dark. Ech of such elemental portions corresponds with a location on viewing screen 31 that roughly has the shape of a square with the dimensions of 1/16" by 1/16".

Computer 30, which is operatively connected to LCD 26 by lines 33, is a standard, general purpose personal computer having controls (including software)

which, in part, control LCD 26 to selectively energize combinations of the pixels of LCD 26 according to the logic of said controls. Computer 30 is also hooked up with a printer (not shown) for enabling further interface with a user; for purposes of this description, the printer is considered to be part of computer 30. LCD 26 enables unaffected passage of light beam 60 through those pixels which are clear but not through those pixels which are opaque. When all of the pixels of LCD 26 are opaque, LCD 26 completely precludes passage of light beam 60 therethrough. LCD 26 is rigidly secured to housing 25 and is positioned horizontally beneath Fresnel condensing lens 22.

First mirror 24 is a first surface mirror which is permanently mounted with a brace 38 to housing 25. Because first mirror 24 is a first surface mirror (i.e., a mirror having its reflective surface on its front surface rather than behind a layer of glass or other material), the image reflected thereby is not distorted or otherwise affected by passage through glass or other materials common in mirrors. First mirror 24 is positioned at a 45 degree angle relative to the horizontal in order to reflect light beam 60 at a right angle toward second mirror 23.

Figure 3:
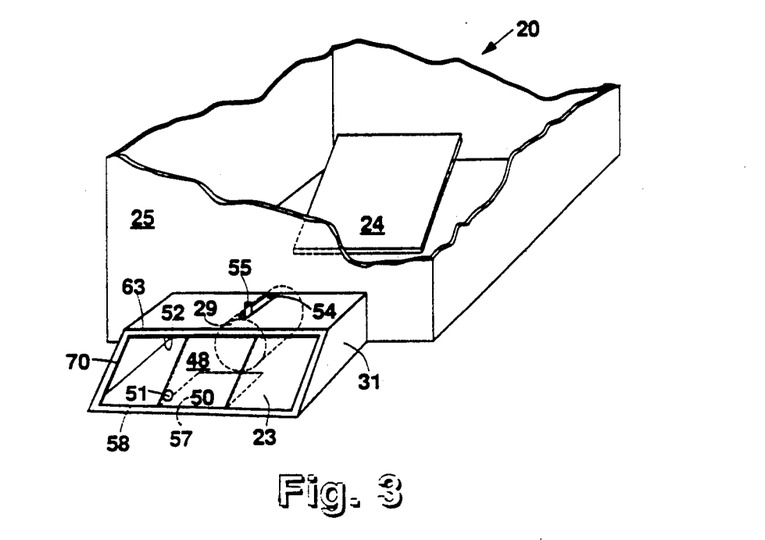
FIG. 3 shows a partially cutaway isometric perspective view of the interfacing projector 20 of the present invention.

As shown in FIG. 3, second mirror 23 has two parts 48 and 49 which are equal in size relative to one another and which are joined together by an adhesive along the center line 50 of second mirror 23. Each of parts 48 and 49 are also first surface mirrors (although part 49 is a first surface transparent mirror). Part 48 is such that, when part 48 is positioned to intercept light beam 60 (i.e. in Mode II operation discussed further herein), light beam 60 is completely reflected therefrom and projected beam 100 is completely precluded from passage therethrough. In contrast, part 49 of second mirror 23 is a transparent mirror, also referred to as a "partial mirror" or a "beam-splitter." Part 49 is such that the projected beam 100 is able to pass therethrough. Part 49 also partially reflects light beam 60 vertically downward so that it is coincident with projected beam 100. Thus, the first, controlled image is superimposed over the second, representative image on viewing screen 31. Parts 48 and 49 are joined coplanar and are slidably received at opposite edges in grooves 52 and 53 (shown best in FIG. 2), which are formed in the distal end of leg 31. Handle 51 is rigidly secured to part 48 near the lower edge thereof so that light beam 60 is not disrupted by the connection of handle 51 when light beam 60 is reflected off of part 48.

Leg 31 has several features for enabling operation of interfacing projector 20 in conjunction with table 12. Referring to FIG. 2, leg 31 is an integral part of housing 25 but protrudes therefrom for intercepting the path of projected beam 100. Grooves 52 and 53 are formed in the distal end of leg 31 for slidably containing second mirror 23 at a 45 degree angle from the horizontal. When interfacing projector 20 is placed in its operative position on the upper surface 15 of reflecting chamber 14, second mirror 23 is positioned at the intersection of the paths of projected beam 100 and light beam 60. In that position, second mirror 23 reflects light beam 60 coincidently with the vertical path of projected beam 100 and precludes or enables transmission of projected beam 100 therethrough (depending on whether the operation is in Mode I or in Mode II). Referring to the mentioned operative position of interfacing projector 20, leg 31 is also provided with an aperture 57 in its lower surface, which aperture 57 corresponds with the size, shape and location of aperture 17 for enabling passage of light beam 60 and projected beam 100 therethrough. Window 58 is also provided in the distal end of leg 31 and, except for due to the effects of second mirror 23, window 58 allows passage of projected beam 100 and light beam 60 therethrough when interfacing projector 20 is in its operative position.

Pegs 66 and 67 (and two similar pegs, not shown) are integrally formed with and protrude from the lower surface of housing 25 for enabling operative positioning of interfacing projector 20 atop reflecting chamber 14. Pegs 66 and 67 are spaced relative to one another. Holes 68, 69 (shown in hidden line) are provided in the upper surface 15 of reflecting chamber 14 in orientations which match those of pegs 66, 67 for receiving pegs 66 and 67 therethrough. To position interfacing projector 20 in its operative position relative to table 12, interfacing projector 20 is placed on the upper surface 15 of reflecting chamber 14 in a manner such that aperture 57 is positioned over aperture 17 and pegs 66 and 67 are inserted into holes 68 and 69, respectively. When operatively positioned in this manner, the relationship between pegs 66, 67 and holes 68, 69 prevents any horizontal movement of housing 25, but interfacing projector 20 is readily removed from table 12 by lifting interfacing projector 20 so that pegs 66 and 67 are removed from holes 68 and 69, respectively.

Projection lens 29 is a means for enlarging and focusing the controlled image of light beam 60 on viewing screen 31. Projection lens 29 comprises two plano-convex lenses assembled at each end within cylinder 61 for receiving, transmitting and focally affecting beam 60 which passes therethrough. The focal characteristics of projection lens 29 are such that light beam 60 can be focused coincidently with projected beam 100 by adjusting projection lens 29. Focusing lens 29 is aligned with light beam 60 between first mirror 24 and second mirror 23 by handle 55 and keys 71, 72. Handle 55 is a cylindrical shaft and keys 71 and 72 are small protuberances. Each of handle 55 and keys 71, 72 are rigidly connected to cylinder 61. Handle 55 is slidably received through slot 54. Keys 71, 72 are slidably received in slot 56. Each of slots 55 and 56 are provided in housing 25 and are parallel to the path of light beam 60 between first mirror 24 and second mirror 23. A user of system 10 can, therefore, adjust the focus of light beam 60 by slidably adjusting the position of handle 55 within slot 54.

Referring to FIG. 3, window 58 is provided in the distal end of leg 31. Window 58 has the shape of a rectangle defined by flange 63, which is integral with leg 31 at its distal end. Window 58 spans substantially the entire width of leg 31, although aperture 57 (beneath window 58) is narrow relative to window 58. Grooves 52 and 53 shown best in FIG. 2) oppose one another and are located along edges of window 58 for slidably supporting second mirror 23 in window 58. Handle 51 is provided for enabling slidable adjustment of second mirror 23 within grooves 52 and 53. As shown in FIG. 3, second mirror 23 is positioned such that part 48 intercepts each of beams 60 and 100, such as is characteristic of Mode II operation; however, by sliding second mirror 23 to a position adjacent to the lateral edge 70 of window 58, part 49 is positioned to intercept beams 60 and 100, such as is characteristic of Mode I operation. Thus, the operation of light projection estimating system 10 can be switched from Mode I to Mode II by sliding adjustment of second mirror 23 within grooves 52 and 53.

Regardless of the mode (i.e. Mode I or Mode II) in which light projection estimating system 10 is operating, computer 30 operates to control LCD 26 in the same manner. Therefore, to simplify further descriptions of the operation of system 10, the phrase, "the first representation on viewing screen 31", is used to reference both the representative image projected on viewing screen 31 and the paper plans placed on viewing screen 31, without reference to Mode I or Mode II operation. The manner of the control of LCD 26 by computer 30 is such that it enables takeoffs from the first representation on viewing screen 31 by causing alteration of the controlled image relative to the first representation on viewing screen 31.

Computer 30 controls LCD 26 in a manner such that most of the pixels of LCD 26 are opaque, and the pixels of LCD 26 which are not opaque define, primarily, a cursor image. Thus, computer 30 controls LCD 26 to project a light image of a cursor onto viewing screen 31. Further, since any alteration of the position of the cursor image defined by LCD 26 corresponds with an alteration of the position of the cursor image on viewing screen 31, computer 30 causes controlled movement of the cursor image on viewing screen 31 by controlling LCD 26. Computer 30 particularly causes such movement in response to position adjustment commands entered by the user of system 10. Computer 30, itself, is controlled in response to a user's entry of commands and values through keyboard 35. In the preferred embodiments, a position adjustment command is entered into computer 30 by the user striking one of four keys on keyboard 35, which four keys are exclusively reserved for the purpose of entering position adjustment commands. Each of said four keys has an arrow inscribed thereon, the arrow of each key pointing in a different orthogonal direction, as is standard for cursor position adjustment keys. Each of said four keys likewise is for entering cursor position adjustment commands to cause movement of the cursor image on viewing screen 31 in one of four different orthogonal directions, which one direction is different than that of the others of said four keys and which is relative to the arrow inscribed thereon. Of course, other means which are standard in the art, such as a mouse or a joystick, could be employed for entering the cursor position adjustment commands.

Proper manipulation of keyboard 35 according to the logic of the controls of a takeoff routine 200 (represented in FIG. 4) of computer 30 inputs commands and values into computer 30 for causing desired operation of the system 10. A simplified flowchart describing the logic of the controls of a takeoff routine 200 of computer 30 is shown in FIG. 4, the logic flow of which controls computer 30 in a manner which enables takeoffs and other estimations from the first representation on viewing screen 31.

Figure 4:
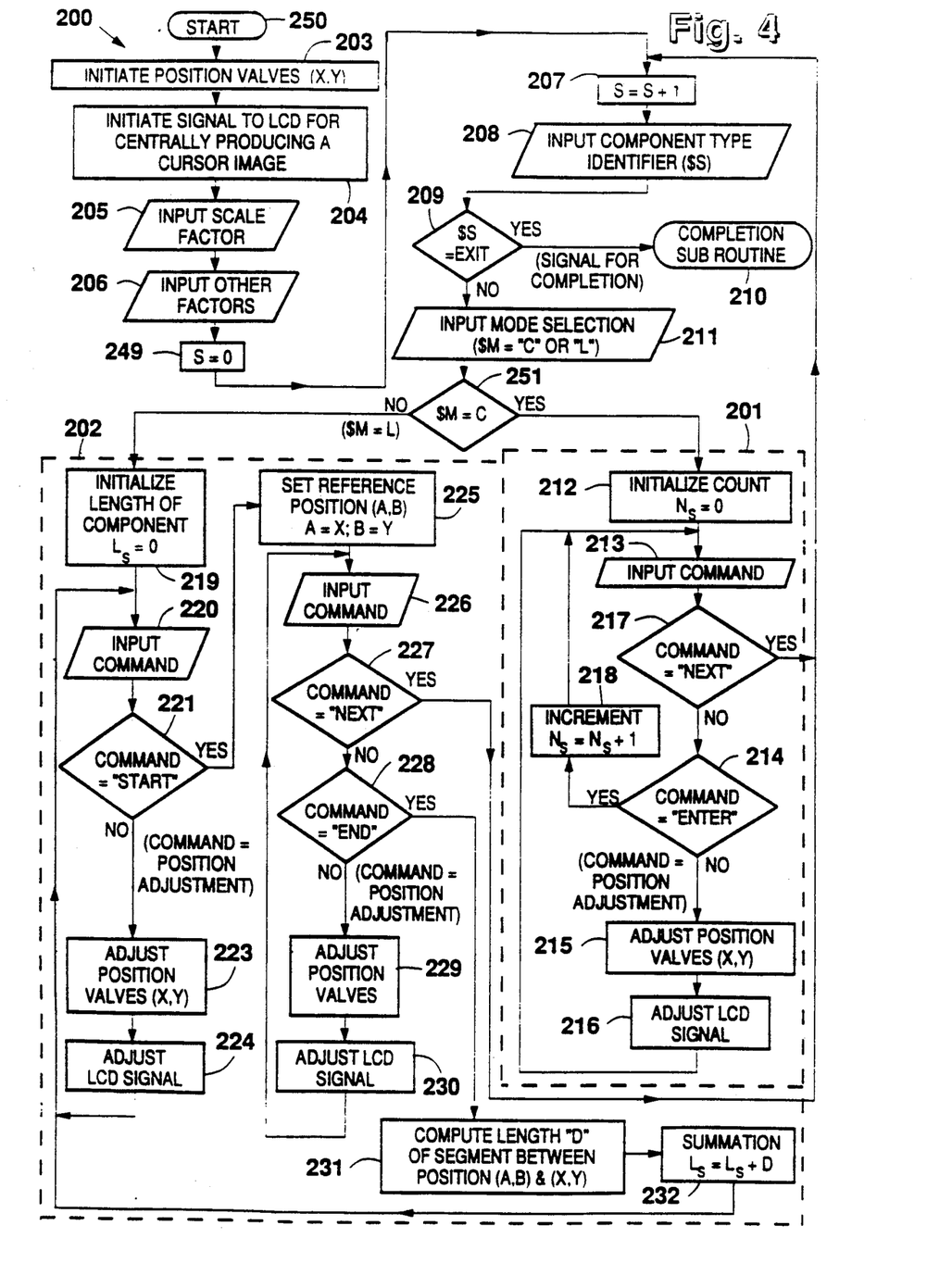
FIG. 4 shows a flowchart of the takeoff routine 200 which controls the operation of the light projection estimating system shown in FIGS. 1 and 2.

The individual representation of steps in the flowchart of FIG. 4 are standard for flowcharts. The oval representations represent the start 250 and the completion 210 of the flowchart. The rectangular boxes represent steps 203, 204, 207, 212, 215, 216, 218, 219, 223, 224, 225, 229-232 and 249 which the computer 30 automatically performs at the corresponding point in the process of its operation. The laterally elongated parallelograms represent steps 205, 206, 208, 211, 213, 220 and 226 in which the user inputs numerical values, commands or identifying strings into computer 30. For proper operation of computer 30, numerical values must be entered at steps 205 and 206; strings which either consist of component type identifiers or consist of the word "EXIT" must be entered at step 208; and a "C" or an "L" should be entered at step 211. In count subroutine 201, the command "NEXT", the command "ENTER", or a position adjustment command must be entered at step 213. In length subroutine 202, either the command "START" or a position adjustment command must be entered at step 220; and the command "NEXT", the command "END", or a position adjustment command must be entered at step 226.

The rhombus (or diamond) shaped boxes represent steps 209, 214, 217, 221, 227, 228 and 251 in which the computer 30 determines answers to questions based on the values or strings in its memory, which answers determine the course of the operation of computer 30. For example, at step 213 a command is entered into computer 30 by a user thereof, if that entered command is "NEXT", then the answer to the question of step 217 will be "YES" and the operation of computer 30 will proceed with step 207. If the command entered at step 213 is "ENTER", the answer to the question of step 217 will be "NO" and the operation of computer 30 will proceed with step 214, the question of which will be answered "YES" which will direct the operation of computer 30 to step 218 and then back to step 213. If the command entered at step 213 is not "NEXT" or "ENTER", then it will be a position adjustment command and the operation of computer 30 will be directed through steps 217 and 214 to steps 216 and 217 and then back to step 213 at which another command will be entered into computer 30 by a user thereof.

In operation, relating to the flowchart of FIG. 4, computer 30 begins the takeoff routine 200 by initializing the position coordinates (X,Y) of the cursor image in the memory of computer 30 in step 203 and centering the cursor image on LCD 26 in step 204. As the coordinate values (X,Y) are subsequently adjusted by the controls of computer 30, the position of the cursor image of LCD 26 is correspondingly adjusted by computer 30 by appropriate energizing and de-energizing of pixels of LCD 26. Because pixels of LCD 26 are enlarged to an image which is 1/16 of an inch square on viewing screen 31, adjustment of the coordinate values (X,Y) is controlled by computer 30 to be incremented by 1/16" of an inch for each individual adjustment signal received from keyboard 35. Similarly, if the embodiment were modified so that the pixels would correspond to images having other dimensions on viewing screen 31, the logic of computer 30 would also be modified to increment the coordinate values (X,Y) to the degree of the dimensions of that pixel image on viewing screen 31.

Once the position coordinates (X,Y) are initialized, the user enters values in step 205 for the scale (e.g., 1 inch=10 feet) of the plan, and the user inputs various other factors which correspond with the various types of components that are of interest in the first representation in step 206. Such other factors include cost factors (i.e., the cost per unit quantity or dimension of a type of component), safety factors, factors for estimating the cost of labor, etc. Those factors are stored in the computer in a plurality of arrays.

Then, the user and computer 30 are prepared for making takeoffs and other estimates relative to each of the types of components represented in the first representation on viewing screen 31—first making takeoffs relative to all the representations of one type of component (as will be described further herein), then doing the same for a second type of component, and so on until takeoffs have been made of all the pertinent types of components. When takeoffs of all the pertinent types of components of the first representation have been made, the user signals computer 30 by entering the command "EXIT" at step 208. Upon receiving that command, computer 30 factors in the various factors entered in steps 205 and 206, thereby producing scaled takeoff values and computing desired estimates such as cost estimates.

To begin making takeoffs for a type of component represented in the first representation, the user first enters a string (represented by "$S" in FIG. 4) into the computer 30 to identify the type of component step 208. The computer 30 identifies that string with the variable "S" and stores it for later recall in a completion subroutine 210 of takeoff routine 200. Then, the user enters a length/count mode selection command, $M, to select either a count mode or a length mode at step 211, depending on whether count takeoffs or length takeoffs are appropriate for the identified type of component, by entering either a "C" or an "L", respectively. From that command, computer 30 initiates one of two subroutines, a "count" subroutine 201 and a "length" subroutine 202. The count subroutine 201 correlates signals from keyboard 35 with its controls to determine the quantity, $N_s$, of the identified type (i.e., $S) of component represented on viewing screen 31. The length subroutine 202 correlates signals from keyboard 35 with its controls to determine the total length, $L_s$, of the identified type of component. Once the total quantity $N_s$, or the total length, $L_s$, appropriately, has been determined for the identified type of component, $S, the user signals the computer by entering the command "NEXT" at step 213 or 226, respectively. When the "NEXT" command has been entered, the user may identify another type of component for which takeoffs are desired by entering a new string $S, or the user may signal the computer to initiate the completion subroutine 210 of takeoff routine 200 by entering the command "EXIT" as the new string $S. Ideally, before the completion subroutine 210 is initiated, the user repeats the process of identifying a type of component (step 208), appropriately selecting the count mode or the length mode (step 211), and controlling the count subroutine 201 or the length subroutine 202 until takeoffs have been made for every desired type of component represented in the first representation.

Also when the "NEXT" command is entered, the variable "S" is incremented in step 207. The variable S is an identifier used by computer 30 to identify the identifying strings, $S, the total length values, $L_s$, and the total count values, $N_s$, of the various types of components for which takeoffs have been made (assuming takeoffs are desired for more than one of the types of components represented in the plans in arrays in the memory of computer 30). For instance, $L_2$ represents the total length of the second identified type of component, and $N_7$ represents the total count of the seventh identified type of component. The value of the variable S indicates the number of the types of components for which takeoffs have been or are being made.

The count subroutine 201 begins by initializing the value of $N_s$ at zero in step 212. The value of $N_s$ as stored in computer 30 is referred to as a "second representation" which is useful for making count takeoffs and secondary estimations of the first representation of the plans, the usefulness of which will be evident below. After initializing the value of $N_s$, count subroutine 201 proceeds to count the number of the identified type of component in response to commands from the user. To command such, the user enters position adjustment commands at step 213 to cause the position of the cursor image on viewing screen 31 to move through the resulting adjustments of steps 215 and 216 so that the cursor image is superimposed on an individual representation of the identified type of component being counted; then the user inputs the command "ENTER" at step 213. When the "ENTER" command is entered at step 213, the question of step 214 is answered affirmatively and, as a result, the computer 30 is directed to increment the value of $N_s$ at step 218, which in turn, causes incrementation of $N_s$ (steps 214–218). Although not represented in FIG. 4, in conjunction with the execution of step 218, computer 30 also controls LCD 26 to cause superimposition of a light image having an "X" shape on the counted feature of the first representation until the count subroutine 201 is completed.

Such steps 213–218 are repeated for each individual representation of the identified type of component of the first representation has been counted. When each of such individual representations has been counted, the user inputs the command "NEXT" at step 213. When the "NEXT" command is entered at step 213, the question of step 217 is answered affirmatively and, consequently, the computer 30 is directed to exit the count subroutine 201 by returning to step 207 to prepare for either exiting the takeoff routine 200 or for making takeoffs of another type of component. Thus, the controlled image on viewing screen 31 is sequentially altered by the count subroutine 201 to display an "X" over each counted one of the components until all of the identified type of component are counted. After all of the identified type of component have been counted and the count subroutine 201 is completed, the user either initiates the completion subroutine 210 by entering the command "EXIT" at step 208 or inputs an identification at step 208 for the next type of component of which takeoffs are desired.

The length subroutine 202 is slightly more complex than the count subroutine 201. The length subroutine 202 begins by initializing the value of $L_s$ at zero in step 219. The value of $L_s$ as stored in computer 30 is referred to as a "second representation" (as is the value of $N_s$ in count subroutine 201) which is useful for making length takeoffs and secondary estimations relative to the first representation. The user then commands computer 30 by entering position adjustment commands at step 220 to move the cursor image on viewing screen 31 (steps 223 and 224) to the starting point of a linear dimension (for example, a line segment) of which a length takeoff is desired. To initiate a length takeoff, after entering cursor position adjustment commands (step 220) to cause superimposition of the cursor image over the starting point of said linear dimension, the user then enters the command "START" at step 220. Once the "START" command has been entered, the question of step 221 is answered affirmatively and as a result, computer 30 is directed to set the current position coordinates (X,Y) of the cursor image as a reference position (A,B) in step 225. Further, in conjunction with the execution of step 225, although not represented in FIG. 4, computer 30 controls LCD 26 to cause the superimposition of an "X" image on the first representation at that starting point until the length subroutine 202 is completed. The user is then able to cause movement of the cursor image to the endpoint of said linear dimension through steps 229 and 230 by entering position adjustment commands at step 226. When the cursor image is superimposed over the endpoint of said linear dimension, the user enters the command "END" at step 226. Although not represented in FIG. 4, when the "END" command has been entered, computer 30 also controls LCD 26 to cause superimposition of an image of a line segment over said linear dimension and superimposition of an "X" image on the first representation at the end of said linear dimension until the length subroutine 202 is completed.

When the "END" command has been entered at step 226, the question of step 228 is answered affirmatively and, as a result, the computer 30 is directed to compute the length D of said linear dimension at step 231 and add that length D to the current value of $L_S$ at step 232, which current value represents the total measured length of the identified type of component. The length D, as computed by computer 30, is referred to as a "fourth representation" which represents the net distance moved by the cursor image of viewing screen 31 between the starting point (A,B) and the endpoint of said linear dimension. Computer 30 thus modifies the value $L_S$ (the second representation) based on the length D (the fourth representation) which represents the alteration of the controlled image in moving the cursor image from the starting point to the endpoint of said linear dimension in response to signals from the user. The computation of the length D of each measured linear dimension is achieved by triangulation relative to the X and Y coordinates of the starting point (A,B) and the endpoint of said linear dimension. When computing the length D of a linear dimension, the X and Y coordinates of the endpoint of that linear dimension are the current position values (X,Y) of the cursor image since the computation of the length D necessarily takes place when the cursor image is at the endpoint of that linear dimension.

Such steps 226–232 are repeated until each linear dimension of the identified type of component has been measured and added to the total length $L_S$ of that type of component. When the total length of that type of component has been measured in this manner, the user enters the command "NEXT" at step 226. When the "NEXT" command has been entered at step 226, the question to step 227 is answered affirmatively and, consequently, the computer 30 is directed through step 227 to exit the length subroutine 202 and prepare for takeoff of another type of component by returning to step 207. Thus, the controlled image on viewing screen 31 is sequentially altered by the length subroutine 202 to superimpose line segments (bounded by "X" images) over each measured one of the linear dimensions of the type of component until the entire length of that type of component on the first representation has been measured. After said entire length has been measured and the length subroutine 202 is completed, the user either initiates the completion subroutine 210 by entering the word "EXIT" at step 208 or inputs an identification for the next type of component of which takeoffs are desired at step 208.

To conclude the making of takeoffs of components from viewing screen 31, the user inputs the command "EXIT" rather than identifying a new type of component at step 208. Such entry of the "EXIT" command initiates a completion subroutine (represented generally as step 210) which factors in the scale factor and the various other factors which were entered in steps 205 and 206. The completion subroutine 210 uses those factors to calculate estimated quantities, dimensions, material costs, and labor costs relative to each of the appropriate types of components which were identified in the course of the previous steps of the takeoff routine 200. As would be obvious to one of ordinary skill in the art, the completion subroutine can be easily modified to perform other desired calculations relative to those types of components as well. The completion subroutine 210 finally causes presentation of the estimated quantities, dimensions, material costs and labor costs along with the corresponding identifying string $S for each of the pertinent types of components in the form of third representations both on a remote portion of the viewing screen 31 (through control of LCD 26) and in a representative printout by the printer of computer 30. Of course, as would be obvious to one of ordinary skill in the art, a CRT could also be connected to computer 30 in order to provide further interface between computer 30 and a user thereof. Thus, in the manner outlined by FIG. 4 and the preceding paragraphs, takeoffs and other estimations relative to the first representation of the plans, either projected or otherwise placed on viewing screen 31, are enabled by light projection estimating system 10.

Although the present invention has been described in reference to the foregoing preferred embodiments of the present invention, many alterations, substitutions, combinations, alternatives and equivalents will be obvious to one of ordinary skill in the art in light of this disclosure, and such are intended to fall within the spirit and scope of the appended claims. Such include, for example, alternations in the logic of the control and general operation of computer 30 and interfacing projector 20 as well as alterations in the particular symbols and expressions used and projected by the same. The order of the steps of the method of the present invention and the particular number and orientations of the mirrors and other features of the apparatus of the invention could also be altered as is obvious to achieve substantially the same results. Also, it will obvious that with still other equivalents which serve substantially the same function in substantially the same way to achieve substantially the same result, other alterations, substitutions, combinations and alternatives are or may become obvious to those skilled in the art. Therefore, any limitations on the scope of the invention are not intended to be defined by the description of the preferred embodiments, but rather by the appended claims as they are construed under applicable laws.

I claim the following:

1. An apparatus for facilitating the creation and storage of information relative to a given job plan, comprising:
    a housing;
    means for releasably connecting said housing to a microfilm viewing table which is adapted for projecting a first beam of light onto a viewing surface on which the image of a microfilm may be viewed when said housing is not connected to said table;
    a light source for projecting a second beam of light, said light source being mounted to said housing;
    an LCD, connected to said housing, for controlling the image of said second beam of light;
    a transparent mirror mounted to said housing;

means for directing said second beam of light through said LCD and to said transparent mirror;

said transparent mirror being oriented relative to said housing such that, when said housing is releasably connected to said microfilm viewing table, said first beam passes through said transparent mirror onto said surface, and said second beam is reflected by said transparent mirror onto said surface in a manner such that the image of said second beam is superimposed over the image of said first beam on said surface.

2. An apparatus for facilitating the creation and storage of information relative to a given job plan, comprising:

a first projector for projecting a first beam through a transparency of a job plan and onto a viewing surface on which the image of said first beam can be viewed;

a second projector for projecting a second beam;

an LCD for controlling the image of said second beam; and means for directing said second beam through said LCD and onto said surface;

said beam directing means comprising a composite mirror positioned at an intersection of said first beam and said second beam, said composite mirror having a first part and a second part which are alternately positioned in said intersection to alternately intercept said first and second beams;

said first part comprising a transparent mirror for superimposing the image of said second beam over the image of said first beam when said first part is positioned in said intersection; and said second part comprising a complete mirror for completely reflecting said second beam onto said surface while blocking the projection of said first beam onto said surface when said second part is positioned in said intersection.

3. The apparatus of claim 2 wherein said composite mirror is slidably received in a housing of said recent projection for enabling alternate positioning of said part and said second part in said intersection.

4. An apparatus for facilitating the creation and storage of data relative to a transparency image comprising:

a housing;

a first light projector mounted to said housing for projecting a first light beam through a transparency of a job plan and onto a viewing surface such that the image of the transparency may be viewed on the viewing surface;

a second projector mounted to said housing for projecting a second beam of light;

an LCD mounted in said housing for altering the image of said second beam;

a transparent mirror mounted to said housing;

means mounted in said housing for directing said second beam light through said LCD and to said transparent mirror;

said transparent mirror being oriented relative to said housing such that said first beam passes through said transparent mirror onto said viewing surface and said second beam is reflected by said transparent mirror onto said viewing surface in a manner such that the image of said second beam is visible said viewing surface and is superimposed over the image of said transparency, enabling visual correlation of the image of said second beam with the transparency image of said first beam on said viewing surface; and an electronic data processing unit for enabling control of the image of said LCD in correlation with the image of said transparency, said unit being interconnected with said LCD and being adapted to selectively store information relative to control of said LCD for further processing.

* * * * *